(12) United States Patent
Ishikawa et al.

(10) Patent No.: US 9,085,465 B2
(45) Date of Patent: Jul. 21, 2015

(54) MANUFACTURING METHOD OF HIGH-PURITY CHLOROPOLYSILANE

(71) Applicant: TOAGOSEI CO., LTD., Tokyo (JP)

(72) Inventors: Kouji Ishikawa, Kariya (JP); Kanemasa Takashima, Tokai (JP); Hiromu Taguchi, Nagoya (JP)

(73) Assignee: TOAGOSEI CO. LTD., Tokyo (JP)

( * ) Notice: Subject to any disclaimer, the term of this patent is extended or adjusted under 35 U.S.C. 154(b) by 0 days.

(21) Appl. No.: 14/358,538

(22) PCT Filed: Dec. 6, 2012

(86) PCT No.: PCT/JP2012/081672
§ 371 (c)(1),
(2) Date: Jul. 14, 2014

(87) PCT Pub. No.: WO2013/089014
PCT Pub. Date: Jun. 20, 2013

(65) Prior Publication Data
US 2014/0363362 A1    Dec. 11, 2014

(30) Foreign Application Priority Data

Dec. 16, 2011    (JP) ................................. 2011-275163

(51) Int. Cl.
*C01B 33/107*    (2006.01)
*C01B 33/08*    (2006.01)

(52) U.S. Cl.
CPC ............... *C01B 33/107* (2013.01); *C01B 33/08* (2013.01); *C01B 33/10742* (2013.01)

(58) Field of Classification Search
CPC   C01B 33/08; C01B 33/107; C01B 33/10715; C01B 33/10736; C01B 33/10742; C01B 33/10763

See application file for complete search history.

(56) References Cited

U.S. PATENT DOCUMENTS 4,861,574 A * 8/1989 Ikeda et al. .................... 423/342
5,723,644 A * 3/1998 Tzou ............................. 556/466

FOREIGN PATENT DOCUMENTS

| JP | A-62-12607 | 1/1987 |
| JP | A-63-233007 | 9/1988 |
| JP | A-10-316691 | 2/1998 |
| JP | A-2002-173313 | 6/2002 |
| JP | A-2010-18508 | 1/2010 |
| JP | A-2010-111544 | 5/2010 |

OTHER PUBLICATIONS

International Search Report issued in International Application No. PCT/JP2012/081672 dated Mar. 5, 2013 (with translation).
Apr. 1, 2015 Notification of First Office Action issued in Chinese Application No. 201280062266.8.

* cited by examiner

*Primary Examiner* — Colleen Dunn
(74) *Attorney, Agent, or Firm* — Oliff PLC

(57) ABSTRACT

A chlorination reaction can be carried out at a relatively low temperature by heating a mixture of granular metallic silicon and metallic copper or a copper compound in an inert atmosphere even when the metallic silicon has a high purity and does not contain aluminum and titanium and that chloropolysilane of high purity can be obtained by further adding metallic silicon as needed after the chlorination reaction is started.

13 Claims, 1 Drawing Sheet

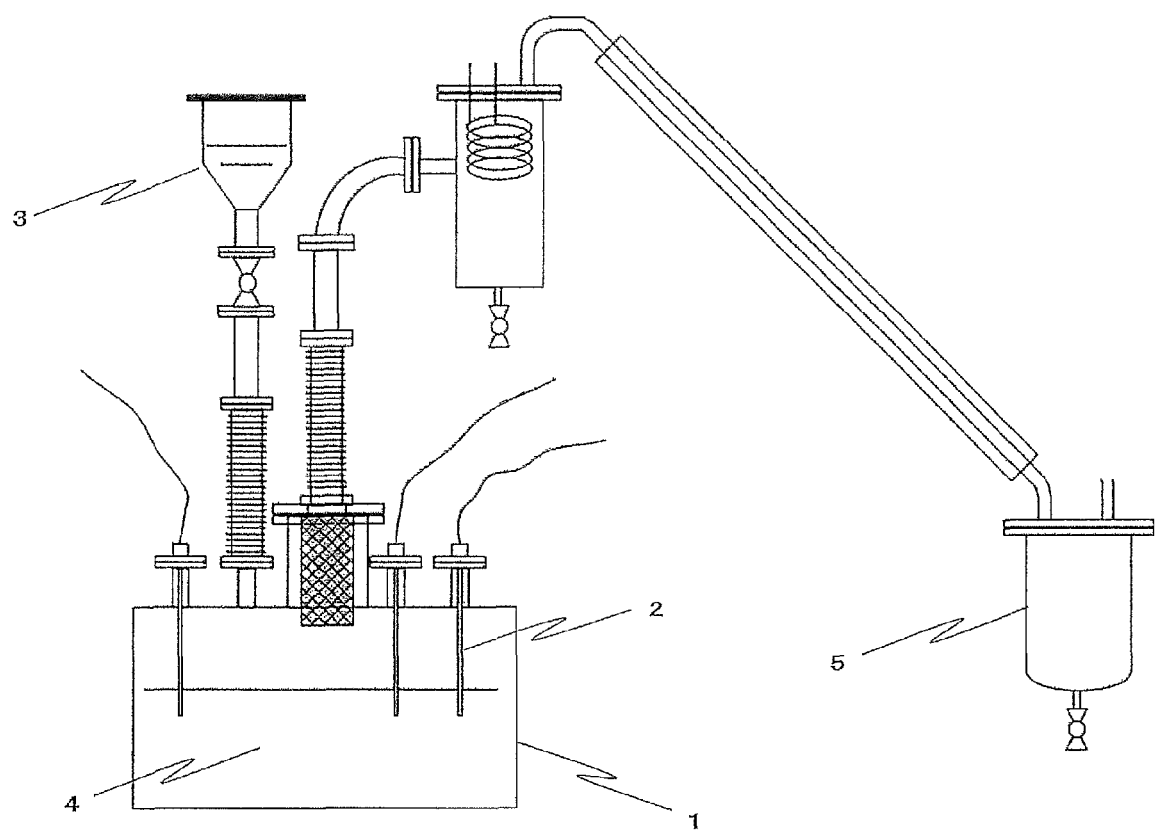

MANUFACTURING METHOD OF HIGH-PURITY CHLOROPOLYSILANE

TECHNICAL FIELD

The present invention relates to a method for manufacturing high-purity chloropolysilane represented by Formula 1, which is highly valued for producing a semiconductor material;

$$Si_nCl_{2n+2} \quad \text{Formula 1,}$$

(where, n in Formula 1 is an integer of 2 or more).

BACKGROUND ART

As a method for manufacturing chloropolysilane represented by Formula 1 having n being an integer of 2 or more, Patent Literature 1 discloses that a mixed product having high selectivity of hexachlorodisilane is obtained by reacting silicon alloy or metallic silicon with chlorine using an oscillating reactor. It further discloses that hexachlorodisilane is obtained by the reaction at a relatively low temperature in the range of 120° C. to 250° C. when a silicon alloy such as ferrosilicon, calcium silicon, or magnesium silicon is used. It also discloses that a higher reaction temperature in the range of 300° C. to 500° C. is preferable when metallic silicon is used as a raw material but the yield of hexachlorodisilane is lowered if the temperature exceeds 500° C.

Patent Literature 2 describes a method for manufacturing tetrachlorosilane and discloses that tetrachlorosilane can be obtained by reacting chlorine diluted to three to ten times (in volume ratio) by an inert gas with metallic silicon in a semifluid state at a reaction temperature in the range of 450° C. to 800° C., although a method for manufacturing chloropolysilane is not described. In this case, it describes that the purity of the metallic silicon is preferably 90% or more because reaction residues can be reduced such as chlorides of Ti, Fe, Al, etc. It further describes that: the reaction is extremely slow when the reaction temperature is lower than 450° C.; a reaction temperature in the range of 600° C. to 800° C. is preferable; and the upper limit of the reaction temperature is limited to 800° C. because the corrosion of a reactor becomes a problem at such a high temperature.

Patent Literature 3 discloses a method of improving the production yield of chloropolysilane by adding copper or a copper compound of preferably 0.1% to 20% by weight to silicon particles and conducting a chlorination reaction. In this case, it describes that the silicon particles as metallic silicon desirably have high purity because the quantity of a solid by-product caused by impurities is small and that preferable purity is 97% or more. It discloses that a preferable temperature of the chlorination reaction is 140° C. to 300° C. and that the production yield of chloropolysilane is lowered if the temperature exceeds 300° C.

In this way, as conventional technologies on a method of obtaining chloropolysilane by chlorinating silicon alloy or metallic silicon, it has been known that a chlorination reaction can be conducted at a relatively low temperature when a silicon alloy of a low silicon content such as ferrosilicon or calcium silicon is used as a raw material. Since it has been known, however, that the reaction is extremely slow at a temperature lower than 450° C. in the reaction of obtaining silicon tetrachloride by reacting metallic silicon with chlorine, it is assumed that a higher temperature tends to be required for chlorination reaction as the purity of the metallic silicon increases. Although the temperature of the reaction for obtaining chloropolysilane can be lowered by using metallic silicon including impurity metals such as iron and calcium having a catalytic activity, the problem has been that chlorinated products of iron and calcium derived from impurity metals are produced and solidified as by-products, and it has been an industrial challenge.

In response, Patent Literature 3 discloses that it is possible to conduct a chlorination reaction at a relatively low temperature in the range of 140° C. to 300° C. by adding copper or a copper compound to silicon even when high-purity silicon particles preferably having purity of 97% or more are used as the raw material to obtain chloropolysilane. The reason why silicon particles of high purity are preferable is that the quantity of solid by-products derived from impurities is small. However, Patent Literature 3 does not describe an object to obtain high-purity chloropolysilane. It does not describe a specific value of the purity of silicon raw material or of the product chloropolysilane. That is, a solution to the problem in obtaining high-purity chloropolysilane is not clearly specified in Patent Literature 3. Further, in consideration of industrial continuous reaction, copper or a copper compound accumulates unavoidably in a reactor when a raw material essentially including copper or a copper compound is added in the reactor, the problem in the solidification of by-products rises in the same manner as iron and calcium, and hence there are still problems for industrial application.

Patent Literature 3 describes that, when obtained chloropolysilane is used as a material of semiconductor silicon or amorphous silicon, the chloropolysilane is used after it is once reduced to the form of $Si_nH_{2n+2}$. Thus, since contamination may possibly occur again at a succeeding reduction process even when purification is applied in the state of chloropolysilane, refinement and purification is conducted after the final product in the form of $Si_nH_{2n+2}$ is obtained in the commonly used procedure. Consequently, at the time Patent Literature 3 was applied, it was not necessary to increase the purity of chloropolysilane so much, and the problem of manufacturing high-purity chloropolysilane itself was not recognized.

In recent years, however, it has been confirmed that, when hexachlorodisilane is used directly as a silicon source for amorphous silicon semiconductor, the growth rate of a silicon film in chemical vapor deposition (CVD) is very large and the electrical properties of the formed film are excellent. Thereafter, a method of directly using hexachlorodisilane as a material for CVD has been used drastically. Moreover, hexachlorodisilane is used also in atomic layer deposition (ALD) allowing formation of a uniform film of one atomic layer level, hence the hexachlorodisilane itself is required to have high purity of a ppm level. Thus, a new problem of how to obtain high-purity hexachlorodisilane used as a semiconductor material is arising. Further, the application of chloride of a higher order such as octachlorotrisilane is also studied.

The present inventors have applied distillation purification to obtain high-purity hexachlorodisilane, and found that chlorides derived from Al and Ti, which are impurities included in metallic silicon, are hardly separable from chloropolysilane because the chloride of Al has a sublimating property and the chloride of Ti has a boiling point close to hexachlorodisilane. The inventors assumed that it is effective to use high-purity metallic silicon having low Al and Ti contents in order to obtain high-purity hexachlorodisilane. If, however, the tendency that chlorination reaction is less likely to occur as the purity of metallic silicon increases is taken into consideration, the chlorination reaction of high-purity metallic silicon has to be conducted at a high temperature. Increased reaction temperature may decrease the durability of a reaction apparatus and increase the cost. Meanwhile, undesired accumulation of metallic copper or a copper compound occurs in the method of adding the metallic copper or copper compound to silicon as mentioned above. No solution to the problem has been provided. That is, the manufacturing of high-purity chloropolysilane has been demanded from industry but the development of a specific industrial manufacturing method has been an unsolved challenge.

CITATION LIST

Patent Literature

PTL1: JP S62-12607 A
PTL2: JP 2002-173313 A
PTL3: JP S63-233007 A

SUMMARY OF INVENTION

Technical Problem

A problem of the present invention is to provide a manufacturing method to obtain chloropolysilane such as hexachlorodisilane of high purity by using high-purity metallic silicon and chlorine as raw materials and reacting them at a relatively low temperature.

Solution to Problem

An activated catalyst having activity to reaction between metallic silicon and chlorine is produced by heating a granular mixture of high-purity metallic silicon and metallic copper or a copper compound in an inert atmosphere. Then, by conducting a chlorination reaction at a relatively low temperature with the use of the activated catalyst, high-purity hexachlorodisilane is obtained. Further, it has been found that chloropolysilane such as hexachlorodisilane of a high purity can be obtained continuously by adding only metallic silicon once the chlorination reaction starts while avoiding the problem of accumulating metallic copper or a copper compound.

Advantageous Effects of Invention

The method according to the present invention makes it possible to manufacture, at a relatively low temperature, chloropolysilane such as hexachlorodisilane having low concentrations of Al and Ti impurities, which are hardly reduced by an ordinary refining method. Further, it is also possible to continue reaction by adding only metallic silicon once reaction starts, hence the cost can be reduced, reaction residues including copper can be reduced, and hence the method is environmentally-friendly.

BRIEF DESCRIPTION OF DRAWINGS

FIG. 1 is a schematic view showing an example of an apparatus for carrying out the present invention.

DESCRIPTION OF EMBODIMENTS

The present invention is explained hereunder in detail.
Chloropolysilane manufactured by a method according to the present invention is represented by Formula 1;

$$Si_nCl_{2n+2} \quad \text{Formula 1,}$$

(where, n in Formula 1 is an integer of 2 or more).
Chlorosilane, presented by Formula 1 with n=1, is also manufactured as a by-product by the method according to the present invention and the manufactured chlorosilane is also industrially useful. However, chlorosilane is industrially mass-produced already by another method and can be manufactured, not necessarily by the method according to the present invention. In contrast, no other method than the method according to the present invention is known as a method of efficiently obtaining chloropolysilane having n of 2 or more and including metallic impurities of Al and Ti at low concentrations.

Specific examples of chloropolysilane expressed by Formula 1 having n of 2 or more include $Si_2Cl_6$, $Si_3Cl_8$, $Si_4Cl_{10}$, $Si_5Cl_{12}$, and $Si_6Cl_{14}$. They may be contained in combination. Further, examples of chloropolysilane also include compounds in which one or more Cl is substituted with a halogen other than Cl such as Br or I. A preferable product among them contains either $Si_2Cl_6$ or $Si_3Cl_8$ as the main component. It is more preferable that the product chloropolysilane contains 10% by mass or more of $Si_2Cl_6$, which is especially useful. Still more preferably, the product chloropolysilane contains 20% by mass or more of $Si_2Cl_6$.

In the manufacturing method according to the present invention, the concentrations of metallic impurities such as Al and Ti in obtained chloropolysilane are preferably low, and the atomic concentrations of Al and Ti in the obtained chloropolysilane are preferably not more than 1,000 ppm by mass respectively in the whole chloropolysilane. More preferable concentrations are not more than 100 ppm by mass respectively.

As metallic silicon in the present invention, silicon having a low metallic impurity concentration is used and a silicon wafer, polycrystalline silicon, and amorphous silicon can be used. With regard to impurity concentrations in metallic silicon, it is essential that metallic elements other than silicon account for not more than 2% by mass in the whole metallic silicon. Further, it is essential among the metallic elements, Al accounts for not more than 0.5% by mass as an aluminum element and Ti accounts for not more than 0.1% by mass as a titanium element in the whole metallic silicon. With regard to preferable impurity concentrations, metallic elements account for not more than 1% by mass in the whole metallic silicon. Further, among the metallic elements, Al accounts for not more than 0.3% by mass, Ti accounts for not more than 0.05% by mass, Fe accounts for not more than 0.2% by mass, and calcium accounts for not more than 0.1% by mass. More preferably, metallic elements account for not more than 0.5% by mass in the whole metallic silicon. Further, among the metallic elements, Al accounts for not more than 0.2% by mass, Ti accounts for not more than 0.01% by mass, Fe accounts for not more than 0.1% by mass, and calcium accounts for not more than 0.04% by mass. With regard to the lower limit of an impurity concentration, a silicon wafer of an eleven nine grade is known and an impurity concentration of less than 0.01 ppb by mass is feasible but a metallic impurity concentration of not less than 1 ppm by mass is suitable for the material used when the present invention is carried out from the viewpoint of industrial availability at a low cost.

Although metallic silicon in the present invention contains carbon and oxygen other than metallic elements as impurities in many cases, they do not so much hinder the object of obtaining high-purity chloropolysilane because the products derived from carbon and oxygen as impurities can be separated from the chloropolysilane easily by a refining method such as distillation. With regard to the purity of silicon in metallic silicon including such nonmetallic impurities, Si accounts for preferably not less than 95% by mass and more preferably not less than 97% by mass in the whole metallic silicon. Adsorbed moisture is not included in the definition of the impurities described above. Since the hygroscopicity of powdered metallic silicon is not so high, the adsorbed moisture is not more than 3,000 ppm by mass in the case of an industrially produced one. It may be used in the present invention, but it is also possible to use it after it is dried by an appropriate method.

Although a substance called by the name of metallic silicon exclusively means so-called metallic grade silicon obtained by reducing silicon dioxide in an arc furnace using a carbon electrode in some cases, high-purity polycrystalline silicon, solar-cell-grade silicon, semiconductor-grade silicon, and the like, which have higher purity, are all included in the metallic silicon in the present invention. In metallic silicon used in the present invention, metallic elements other than silicon account for not more than 2% by mass in the whole metallic silicon. Among them, Al accounts for not more than 0.5% by mass and Ti accounts for not more than 0.1% by mass in the whole metallic silicon, and additionally impurities such as carbon and oxygen may be included. Preferably metallic elements other than silicon account for not more than 1% by mass in the whole metallic silicon. Among them, Al accounts for not more than 0.3% by mass and Ti accounts for not more than 0.05% by mass in the whole metallic silicon.

The metallic silicon used in the present invention preferably has a granular shape. As the particle size reduces, the surface area increases and hence the reactions for activation of the catalyst and chlorination is likely to be caused. In contrast, as the particle size increases, the quantity of scattering metallic silicon reduces desirably when a fluidized-bed reactor is used. The particle size of metallic silicon can be measured with a laser diffraction type particle size distribution profiler. A particle size distribution can be analyzed, on the basis of a volume, and a median diameter can be used as the representative value of a particle size, for example. A median diameter of metallic silicon in the present invention is preferably between 1 μm and 5 mm and more preferably between 100 μm and 3 mm.

In the present invention, chlorine used for chlorination reaction of metallic silicon may be diluted with an inert gas such as nitrogen or argon, or may include silicon chloride or hydrogen chloride. In the case the chlorine contains hydrogen chloride, silicon chloride, which has a form in which a part of the Cls in Formula 1 is substituted by H, is obtained. The chlorine does not preferably contain hydrogen chloride. The chlorine gas preferably contains an inert gas, and more preferably a nitrogen gas. The chlorine gas diluted with an inert gas is preferable because the reaction to metallic silicon is suppressed and rapid heat generation is inhibited on the surface of silicon particles. When the chlorine gas is diluted with an inert gas, chlorine content is preferably not more than 90% by mass and more preferably not more than 50%. The lower limit of the chlorine content is 0.1% by mass.

A manufacturing method according to the present invention essentially includes a first process to produce an activated copper catalyst from metallic silicon and copper or a copper compound in order to start chlorination reaction in a second process. Examples of copper or a copper compound include metallic copper, copper halide, copper sulfate, copper nitrate, copper carbonate, basic copper carbonate, organic acid copper, etc. The oxidation number of a copper compound may be either one or two, and different kinds of copper and copper compounds can be used in combination. Among them, metallic copper and copper chloride are preferable and metallic copper is more preferable. The copper or a copper compound preferably has a granular shape. As the particle size reduces, the surface area increases and the activation reaction of the catalyst is more likely to be caused. If the particle size reduces excessively, however, aggregation or powder soaring at handling are more likely to be caused and hence the median diameter of copper or a copper compound is preferably between 1 μm and 0.2 mm and more preferably between 10 μm and 0.1 mm. As the case of metallic copper powder, powders produced by various methods such as wet-type reduced copper powder, atomized copper powder, and powder of a flattened shape called a stamped material are known and any of them can be used. When the copper is subjected to a catalyst activation reaction with the metallic silicon, copper powder of a dendrite shape called electrolytic copper powder is also used preferably.

An activated copper catalyst can be produced by making metallic silicon contact with metallic copper or a copper compound and heating them at a temperature of not lower than 250° C. Although the temperature has no upper limit in the process, a preferable upper limit is 400° C. in consideration of industrial equipment because equipment of generating and withstanding a high temperature is costly. A more preferable heating temperature is not lower than 280° C. to not higher than 350° C. A heating time is preferably not less than 10 min. to not more than 24 hr and more preferably not less than 1 hr to not more than 12 hr. A preferable condition in the production of an activated copper catalyst is heating in an inert gas atmosphere. This condition is selected to prevent oxides of silicon and copper from forming and deteriorating the catalytic activity. It is also possible to heat it in a reduction atmosphere such as hydrogen or a chlorine atmosphere. Another preferable condition is heating metallic silicon and metallic copper or a copper compound while fluidizing them. For the fluidization, a known apparatus such as a vibro-fluidized bed, a gas phase fluidized bed, or a paddle type can be applied. The vibro-fluidized bed is preferable because silicon and copper or a copper compound are in the state of particles having large specific gravities and are hard to be flowed in the chlorination reaction. More preferably, they are heated while they are fluidized in an inert gas atmosphere.

Generation of the activated copper catalyst may be confirmed by detecting start of the chlorination reaction. Alternatively, the concentration of the activated copper catalyst may be confirmed by removing the copper or copper compound that was added for the generation of the activated catalyst to remain unreacted and then by measuring the concentration of the copper catalyst in the resultant metallic silicon. When an activated catalyst is produced from metallic silicon and metallic copper for example, whereas unreacted metallic copper is removed with nitric acid, the portion of the metallic copper exchanged to an activated catalyst by the reaction between silicon and copper does not dissolve in nitric acid and hence can be identified. The concentration of an activated copper catalyst in the present invention is preferably not less than 2 ppm by mass to not more than 10% by mass and more preferably not less than 5 ppm by mass to not more than 5% by mass with respect to a total mass including metallic silicon.

After or at the same time when an activated copper catalyst is produced in the first process, it is possible to start chlorination reaction by adding a chlorine gas to the activated copper catalyst and metallic silicon in a reactor in the second process. A reactor used for chlorination reaction may preferably be a reactor withstanding corrosion by a chlorine gas and may be a fixed bed type, preferably a fluidized bed type, and more preferably a vibro-fluidized bed type. Further, a reactor for chlorination reaction preferably has an inlet of a chlorine gas, an outlet of a product gas, an inlet of material silicon, an outlet of a reaction residue, etc. and also preferably has a heating and cooling mechanism and a thermometer, which are capable of inner temperature adjustment. In the present invention, after chlorination reaction is started by an activated copper catalyst, metallic silicon is chlorinated and consumed but the chlorination reaction can be continued by adding metallic silicon containing or not containing an activated copper catalyst to the reactor.

The chlorination reaction of metallic silicon can be carried out by starting the supply of a chlorine gas after or at the same time as the production of an activated catalyst. The chlorination reaction of metallic silicon is carried out preferably in the range of 150° C. to 300° C. from the viewpoint that the selectivity of hexachlorodisilane in chlorosilane is superior. The range is more preferably 170° C. to 270° C., still more preferably 200° C. to 250° C., and particularly preferably 210° C. to 230° C. The temperature of chlorination reaction can be adjusted by using a heat medium. At the first stage of the reaction, for example, heat may be applied by raising the temperature of a heat medium in order to raise the temperature up to a prescribed reaction temperature. When the chlorination reaction advances, the prescribed reaction temperature may be retained by adjusting the temperature of the heat medium while the temperature rise caused by reaction heat is taken into consideration. The chlorination reaction can be applied under ordinary pressure, increased pressure, or reduced pressure. The reactivity of the chlorination reaction increases under increased pressure.

Although chlorination reaction tends to advance as the quantity of supplied chlorine increases, chlorine is harmful and hence an exhaust gas cannot be discharged as it is if unreacted chlorine is contained in the exhaust gas, and additional effort for separation treatment or recycling is required. It is possible to consume all chlorine supplied to a reactor through chlorination reaction if the quantity of supplied chlorine decreases but it takes excessive time for reaction if the quantity of supplied chlorine decreases excessively. Consequently, the quantity of supplied chlorine per 10 kg of metallic silicon is in the range of preferably 1 to 500 L/hr, more preferably 10 to 300 L/hr, still more preferably 25 to 200 L/hr, and particularly preferably 50 to 100 L/hr. The volume here indicates the value at standard temperature and pressure. Further, chlorine may be supplied dispersively to metallic silicon by dividing the injection site into plural sites. The chlorine gas may be supplied either continuously or intermittently. Further, it is possible to charge a prescribed quantity of metallic silicon at the beginning and not to supply it additionally up to the end of reaction, or to supply metallic silicon sequentially during the reaction and carry out chlorination reaction continuously.

In the present invention, since produced chloropolysilane hydrolyzes and it in turn decreases the reaction yield if moisture is contained in a diluent gas or material chlorine, it is preferable that the moisture content is low. A moisture content in a diluent gas is preferably not more than 10,000 ppm by volume, more preferably not more than 5,000 ppm by volume, and particularly preferably not more than 1,500 ppm by volume. A moisture content in chlorine is preferably not more than 5,000 ppm by volume, more preferably not more than 1,000 ppm by volume, and particularly preferably not more than 500 ppm by volume. The lower limits are not particularly specified but, in consideration of the cost incurred in removing moisture and refining and keeping airtightness of equipment, the lower limits of a diluent gas and chlorine are preferably not less than 0.01 ppb by volume and more preferably not less than 0.1 ppb by volume, respectively.

Chloropolysilane produced by chlorination reaction and represented by Formula 1 is condensed into a liquid state with a condenser or the like and is taken into a receiver. It successively can be refined by methods such as filtration, adsorption, and distillation and thus a useful component can be taken out.

<Effects>

In the case of using Fe—Si or Ca—Si alloy or metallic silicon including a lot of impurity elements such as Al and Ti as a raw material, it is assumed that bonding between silicon and another atom or Si—Si bonding tends to be broken, thus chlorination reaction is likely to advance, and the chlorination reaction can be carried on at a relatively low temperature even when the quantity of a copper catalyst is small or no copper catalyst is used. In the case of adding high-purity metallic silicon during reaction in contrast, the high-purity metallic silicon does not react at all and remains intact. However, surprisingly, when metallic silicon including an activated copper catalyst is added when the chlorination reaction is started in the present invention, the chlorination reaction continues even when an activated copper catalyst is not included in metallic silicon that is added later and the metallic silicon not including an activated copper catalyst also undergoes the chlorination reaction. The reason why such a phenomenon occurs is not obvious but it is assumed that, since copper chloride has an appropriate sublimating property and since reactivity between copper and silicon is high, a copper catalyst component migrates into the metallic silicon not including the activated copper catalyst when the metallic silicon including the activated copper catalyst is consumed by the chlorination reaction.

When metallic silicon is added and reacts during chlorination reaction, the metallic silicon may be added either intermittently or continuously. One of the preferable embodiments is to charge metallic silicon into a reactor through a slot with a closed hopper connected to the reactor. Metallic silicon can be charged continuously by quantitative transportation means such as a screw feeder at a slot. If an excessively large quantity of metallic silicon is charged at a time, reaction balance may be destroyed temporarily in a reactor and unreacted chlorine may flow out. If the quantity of added metallic silicon is too small in contrast, metallic silicon in a reactor may be consumed completely. One good method is to control the quantity of charged metallic silicon so that the height of a powder surface may not change while the height of the powder surface in a reactor is measured.

EXAMPLES

The present invention is hereunder explained specifically in reference to examples but is not limited to the following examples. Here, "part" means a part by mass and "ppm" means ppm by mass unless otherwise specified. With regard to "%", it represents % by mass except when it is expressed as % by area.

<Gas Chromatography of Chloropolysilane>

Analyzer: gas chromatograph (Type "5890"), made by Hewlett-Packard Company
Detector: TCD
Detector temperature: 300° C.
Column: "TC-5" (length 25 m, inner diameter 0.53 mm), made by GL Sciences Inc.
Carrier gas: helium
Sample inlet temperature: 270° C.
Column heating condition: 50° C. to 300° C. (heating rate: 10° C./min)

The ratio of the area of a component peak observed on a chart to the sum of the all peak areas is regarded as an estimated value of a mass composition ratio of each component. The percentage of a component peak area to the sum of all peak areas is defined as % by area.

<Analysis Method for Metals in Chloropolysilane>

The quantity of metallic impurities included in chloropolysilane was analyzed by measuring the mass concentration of metallic atoms in the chloropolysilane by directly injecting the chloropolysilane into a frame-less atomic absorption spectrometer and measuring the concentration of a metallic component in a measurement sample.

Example 1

As a first process, 24.2 kg of metallic silicon, as shown in Example 1 of Table 1, and 1.0 kg of metallic copper (electrolytic copper powder) are charged into a vibro-fluidized bed reactor shown by the reference numeral 1 in FIG. 1. The interior of the vibro-fluidized bed reactor was replaced with nitrogen, and successively the injection rate of the nitrogen was set at 10 L/hr. An activated copper catalyst was produced by vibrating the reactor 1 at a frequency of 1,500 cpm (counted number of the vibration per min) and at an amplitude of 3 mm with an eccentric motor and applying heat for three hours by setting the heat medium temperature of a heat medium jacket covering the exterior of the reactor 1 at 320° C.

Successively as a second process, the heat medium of the heat medium jacket covering the exterior of the reactor 1 was set at 220° C. The reactor 1 was continually vibrated at a frequency of 1,500 cpm (counted number of the vibration per min) and an amplitude of 3 mm. After the nitrogen was injected for 30 min at the rate of 10 L/hr, a mixed gas including chlorine and nitrogen (50%/50% by volume) was injected. The number of injection pipes shown by the reference numeral 2 in FIG. 1 was three and the lengths were adjusted so that the ejection ports might be located below the surface of the vibrated and fluidized powder. The mixed gas was produced by mixing liquefied chlorine for general industrial use and nitrogen for general use (not less than 99.5% inpurity) made by TOAGOSEI CO., LTD. and fed at a flow rate of 250 L/hr in terms of standard temperature and pressure equivalent with mass flow controllers respectively, and was injected equally from the three injection pipes.

Shortly after the flow of the chlorine gas is started, a product liquid was observed flowing out in a receiver. An exhaust gas of an unliquefied part mostly included tetrachlorosilane and the chlorine gas was not included in the exhaust gas as a result of introducing the gas into an exhaust gas treatment device and monitoring the chlorine gas concentration. The reaction continues for 1 hr, 0.93 kg of the product liquid obtained after 1 hr was taken in a receiver 5. The product liquid was analyzed by gas chromatography and analysis of the metal components. The results are shown in Table 2.

Example 2

Example 2 was carried out using the same conditions as those in Example 1, except for replacing the metallic silicon in Example 1 with the one shown in Example 2 of Table 1. The results of analyzing the product liquid are shown in Table 2.

Example 3

Example 3 was carried out using the same conditions as those in Example 1, except for replacing the metallic silicon in Example 1 with the one shown in Example 3 of Table 1. The results of analyzing the product liquid are shown in Table 2.

Example 4

In the same reaction as Example 1, after the chlorination reaction in the second process was carried out for 1 hr, without changing the reaction conditions, 5 kg of the same metallic silicon as in Example 1 was charged in a material feed tank of the reference numeral 3 in FIG. 1, and the reaction was continued while the metallic silicon was supplied at a supply rate of 180 g/hr. When the quantity of the metallic silicon in the material feed tank became small, additional metallic silicon was added to the material feed tank as appropriate. Here, a copper catalyst was not added to the supplied metallic silicon. Further, a chlorine gas was not included as a result of monitoring the chlorine gas concentration in the exhaust gas of the unliquefied part. The reaction was continued for 95 hr and 93.5 kg of a product liquid was obtained. Apart of the product liquid was extracted and analyzed by gas chromatography and analysis of the metal components. The results are shown in Table 2.

Example 5

Continuous reaction was carried out under the same conditions as those in Example 4, except that a copper-catalyst-added metallic silicon subjected to the same first process as in Example 1 was prepared beforehand, and 5 kg of the copper-catalyst-added metallic silicon was charged into the material feed tank of the reference numeral 3 in FIG. 1 in the first place. When the quantity of the metallic silicon in the material feed tank became small, the copper-catalyst-added metallic silicon subjected to the first process was added to the material feed tank as appropriate. A chlorine gas was not included in the exhaust gas. The reaction was continued for 95 hr and 94.8 kg of a product liquid was obtained. A part of the product liquid was extracted and analyzed by gas chromatography and analysis of the metal components. The results are shown in Table 2.

Comparative Example 1

Comparative Example 1 was carried out in the same manner as Example 1 except that the metallic silicon in Example 1 was replaced with the silicon material shown in Comparative Example 1 of Table 1 and the results of analyzing the product liquid are shown in Table 2. The silicon material in Comparative Example 1 is an alloy of silicon and iron which is generally called ferrosilicon and commercially available.

TABLE 1

| Silicon material | Median diameter (μm) | Si purity (% by mass) | Al concentration (mass) | Ti concentration (mass) | Fe concentration (mass) | Ca concentration (mass) |
|---|---|---|---|---|---|---|
| Example 1 | 530 | 99.7 | 900 | 20 | 350 | 100 |
| Example 2 | 430 | 99.5 | 1,800 | 120 | 1,100 | 230 |

TABLE 1-continued

| Silicon material | Median diameter (μm) | Si purity (% by mass) | Al concentration (mass) | Ti concentration (mass) | Fe concentration (mass) | Ca concentration (mass) |
|---|---|---|---|---|---|---|
| Example 3 | 72 | 99.9 | 320 | 2 | 26 | 28 |
| Example 4 | 530 | 99.7 | 900 | 20 | 350 | 100 |
| Example 5 | 530 | 99.7 | 900 | 20 | 350 | 100 |
| Comparative Example 1 | 700 | 46.0 | 15,500 | 1,400 | 516,000 | 2,800 |

Metallic silicon includes mostly carbon as an impurity other than metallic elements. The difference between the purity of metallic silicon and the sum of metallic impurities in Table 1 is mostly due to the content of carbon.

TABLE 2

| | GC analysis value (% by area) | | | | Metal component analysis value (ppm by mass) | | |
|---|---|---|---|---|---|---|---|
| | $SiCl_4$ | $Si_2Cl_6$ | $Si_3Cl_8$ | Others | Al | Ti | Cu |
| Example 1 | 63.0 | 26.6 | 9.7 | 0.7 | 14.1 | 4.7 | 1.7 |
| Example 2 | 58.3 | 31.1 | 8.9 | 0.7 | 35.0 | 21.5 | 2.0 |
| Example 3 | 70.3 | 21.0 | 8.2 | 0.5 | 6.8 | 0.3 | 1.7 |
| Example 4 | 65.0 | 25.7 | 9.3 | 1.9 | 13.5 | 2.8 | 1.2 |
| Example 5 | 64.3 | 26.1 | 9.6 | 1.6 | 14.3 | 5.9 | 2.4 |
| Comparative Example 1 | 33.4 | 54.4 | 11.2 | 1.0 | 2,810 | 1,650 | 2.6 |

GC analysis in Table 2 means gas chromatography and the results show that the production efficiency of $Si_2Cl_6$ and $Si_3Cl_8$ is good when ferrosilicon of a low Si purity is used as a material, but the results of the analysis of the metal components show that large quantities of Al and Ti impurities exceeding 1,000 ppm are included. In consideration of the fact that it is difficult to refine and remove the chlorides of Al and Ti, which leads to an increase of labor efforts and cost in order to increase purity and a significant decrease in yield, it can be concluded that the present invention is an excellent method of high production efficiency as a manufacturing method of chloropolysilane having small contents of Al and Ti impurities.

Further, it is a surprising effect that not only the Cu concentration but also the Ti concentration is low in the product liquid in Example 4, where metallic silicon not subjected to the first process at the continuous reaction is added. In Example 5, where metallic silicon accompanying an activated copper catalyst as a result of being subjected to the first process is added, it is understood that the Cu concentration rose in the product liquid as a result of increasing the copper concentration in the system during continuous reaction. However, the reason why the Ti concentration also increased is still not obvious although it is assumed that copper had a catalytic function also to the chlorination of Ti in metallic silicon and accelerated the production of Ti chloride. It can be said that a manufacturing method in which metallic silicon not being subjected to the first process and not having an activated copper catalyst is added is excellent as a method of not only reducing a manufacturing cost and a reaction residue but also obtaining high-purity chloropolysilane.

The present invention is a method capable of manufacturing chloropolysilane including abundantly hexachlorodisilane and having small contents of Al and Ti impurities which are hardly removable by refining. The chloropolysilane obtained by a method according to the present invention is highly valued as a material for manufacturing a semiconductor.

1. Vibro-fluidized bed reactor
2. Chlorine injection pipe
3. Metallic silicon feed tank
4. Metallic silicon
5. Product liquid receiver

The invention claimed is:

1. A manufacturing method of chloropolysilane represented by Formula 1, comprising:
   a first process of producing an activated copper catalyst from metallic silicon and metallic copper or a copper compound, wherein an amount of metallic elements other than silicon contained in the metallic silicon is 2% by mass or smaller with respect to a total mass of the metallic silicon, and among the metallic elements other than silicon, amounts of Al and Ti are 0.5% or smaller and 0.1% or smaller by mass, respectively, with respect to the total mass of the metallic silicon; and
   a second process of conducting chlorination reaction of metallic silicon under the existence of the activated copper catalyst;

$$Si_nCl_{2n+2} \qquad \text{Formula 1,}$$

(where, n in Formula 1 is an integer of 2 or more).

2. The manufacturing method of chloropolysilane according to claim 1, wherein the metallic silicon is granular metallic silicon having a volume median diameter, which is measured with a laser diffraction type particle size distribution profiler, of 1 μm or larger and 5 mm or smaller, and the metallic copper or the copper compound is a particle having a median diameter of 1 μm or larger and 0.2 mm or smaller.

3. The manufacturing method of chloropolysilane according to claim 2, wherein metallic silicon is added in the second process without being subjected to the first process, an amount of metallic elements other than silicon contained in the metallic silicon being 2% by mass or smaller with respect to a total mass of the metallic silicon, and among the metallic elements other than silicon, amounts of Al and Ti being 0.5% or smaller and 0.1% or smaller by mass, respectively, with respect to the total mass of the metallic silicon.

4. The manufacturing method of chloropolysilane according to claim wherein the contents of Al and Ti are not more than 1,000 ppm by mass respectively in chloropolysilane represented by Formula 1.

5. The manufacturing method of chloropolysilane according to claim 4, wherein the reaction temperature in the second process is in the range of 150° C. to 300° C.

6. The manufacturing method of chloropolysilane according to claim 5, wherein a fluidized bed reactor is used at least in the second process.

7. The manufacturing method of chloropolysilane according to claim 6, wherein the fluidized bed reactor is a vibro-fluidized bed reactor.

8. The manufacturing method of chloropolysilane according to claim 1, wherein metallic silicon is added in the second process without being subjected to the first process, an amount of metallic elements other than silicon contained in the metallic silicon being 2% by mass or smaller with respect to a total mass of the metallic silicon, and among the metallic elements other than silicon, amounts of Al and Ti being 0.5% or smaller and 0.1% or smaller by mass, respectively, with respect to the total mass of the metallic silicon.

9. The manufacturing method of chloropolysilane according to claim 8, wherein the contents of Al and Ti are not more than 1,000 ppm by mass respectively in chloropolysilane represented by Formula 1.

10. The manufacturing method of chloropolysilane according to claim 1, wherein the contents of Al and Ti are not more than 1,000 ppm by mass respectively in chloropolysilane represented by Formula 1.

11. The manufacturing method of chloropolysilane according to claim 1, wherein the reaction temperature in the second process is in the range of 150° C. to 300° C.

12. The manufacturing method of chloropolysilane according to claim 1, wherein a fluidized bed reactor is used at least in the second process.

13. The manufacturing method of chloropolysilane according claim 12, wherein the fluidized bed reactor is a vibro-fluidized bed reactor.

* * * * *